United States Patent [19]
Schlarb

[11] 3,743,325
[45] July 3, 1973

[54] SWIVEL UNIT FOR SMALL ROTARY DRILLING RIG

[76] Inventor: Charles S. Schlarb, Post Office Box 520, Walla Walla, Wash. 99362

[22] Filed: May 11, 1971

[21] Appl. No.: 142,227

[52] U.S. Cl............. 285/94, 285/61, 285/98, 285/110
[51] Int. Cl. ....... F16l 7/00, F16l 17/00, F16l 27/00
[58] Field of Search.............. 285/272, 98, 110, 285/282, 61, 94; 175/207

[56] References Cited
UNITED STATES PATENTS

| 2,281,019 | 4/1942 | Brauer | 285/61 |
| 2,218,473 | 10/1940 | Minor | 285/281 |
| 655,315 | 8/1900 | Vaughan | 285/110 X |
| 3,434,742 | 3/1969 | Swinney | 285/272 X |
| 1,629,650 | 5/1927 | Brauer | 285/61 X |
| 1,608,505 | 11/1926 | Hindman | 285/61 X |
| 2,365,048 | 12/1944 | Bruno | 285/110 X |
| 2,903,278 | 9/1959 | Wormser | 285/272 X |

Primary Examiner—Thomas F. Callaghan

[57] ABSTRACT

A swivel unit which has for its main part a seal for positioning against a seal shoulder, the seal being expandable outwardly against the shoulder by a liquid pressure, the seal being freely rotatable whenever the liquid pressure is relieved.

1 Claim, 1 Drawing Figure

PATENTED JUL 3 1973 3,743,325
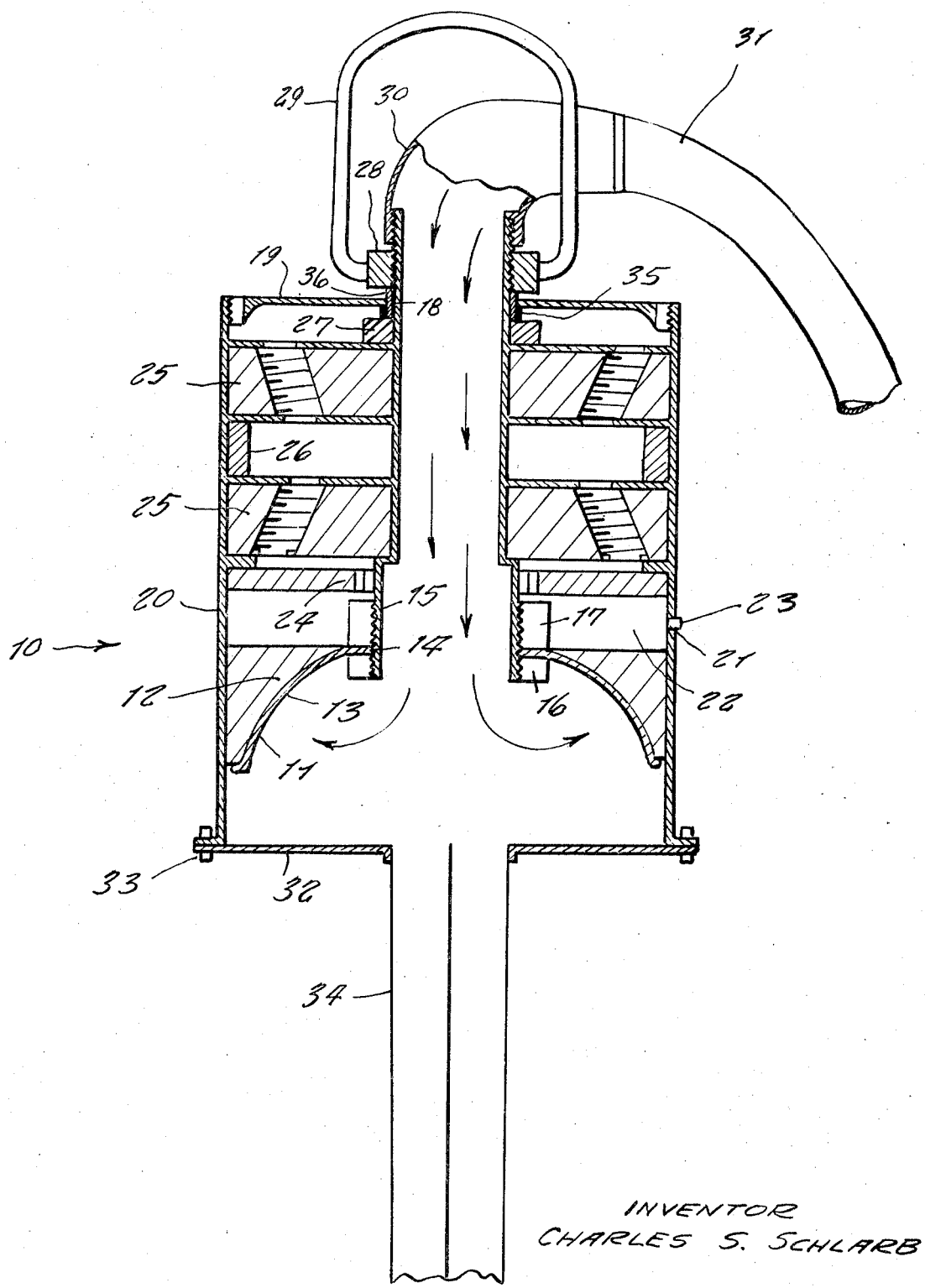
INVENTOR
CHARLES S. SCHLARB

SWIVEL UNIT FOR SMALL ROTARY DRILLING RIG

This invention relates generally to hydraulic seals.

A principle object of the present invention is to provide a swivel unit for use on small rotary drilling rigs, and which eliminates the old conventional type packing system.

Another object is to provide a swivel unit that is small and compact so to eliminate forming a bulky member requiring great space.

Yet another object is to provide a swivel unit, having advantages whereever rotation of a member is necessary with liquid traveling therethrough.

Yet a further object is to provide a swivel unit that is likewise adaptable to hold air pressure under compression forces at same conditions as liquids.

Other objects are to provide a SWIVEL UNIT for SMALL ROTARY drilling rigs, which is simple in design, inexpensive to manufacture, rugged in construction, easy to use and efficient in operation.

These and other objects will be readily evident upon a study of the following specification and the accompanying drawing wherein:

The sole FIGURE is a side cross sectional view of a unit incorporating the principles of the present invention.

Referring now to the drawing in detail, the reference numeral 10 represents a SWIVEL UNIT FOR SMALL ROTARY DRILLING RIGS according to the present invention, wherein there is a seal 11 for seating against a seal shoulder 12. The seal 11 comprises a pliable circular diaphragm 13 having a central opening 14 for being fitted around an outer side of an externally threaded sleeve 15 having a pair of nuts 16 and 17 threadingly mounted therearound; the portion of the seal around the central opening 14 being retained between the nuts 16 and 17.

The sleeve 15 extends through a central opening 18 of a top end plate 19 threadingly secured within top end of swivel case 20.

An opening 21 through the wall of case 20 communicates with oil reservoir 22, the opening 21 being closable by an oil plug 23.

The construction includes an oil seal 24, taper bearing 25 with spaces 26 therebetween, a jam nut 27 for bearing and a hanger nut 28 for a U-shaped hanger 29.

There is an elbow 30 for connection of a hose 31 to the sleeve upper end protruding upwardly of the top plate 19. A sleeve 36 is fitted around sleeve 15 and is placed between parts 27 and 28.

A bottom plate 32 is secured by bolts 33 to bottom of the swivel case 20 for connection to a Kellie bar 34.

Above the jam nut 27, there is a seal 35.

In operative use, the seal 11 expands as liquid pressure forces it outwardly against the seal shoulder 12 for a sealing action. The seal yet rotates freely every time that the pressure is released, so to allow the seal to contract and oil itself.

While various changes may be made in the detail construction, it is to be understood that such changes will be within the spirit and scope of the present invention.

I claim:

1. In a swivel unit for a small rotary drilling rig, the combination of a cylindrical swivel case side wall, a top end plate and a bottom end plate attached within upper and lower ends respectively of said swivel case, said top end plate having a central opening, a central sleeve extending through said opening and secured to said top end plate, said sleeve having an upper end extending outward of said case and being attached to an elbow which is secured to one end of a hose, said sleeve having an enlarged lower end spaced from said bottom end plate, said unit including a lower chamber surrounding the lower end of said sleeve communicating with said sleeve and the central opening in the bottom end plate, a curved seal seat secured to said case about said sleeve, a curved seal secured about said sleeve and extending radially outward and downward from said sleeve to a periphery adjacent said case side wall, said seal being flexible and adapted to sealingly contact said seat when predetermined fluid pressure is in said chamber and to unseat itself when said pressure is lowered, an oil reservoir located above the seat about the sleeve and having access means to said seal when said seal is unseated, second sleeve mounted in the opening in the top plate between said top plate and said first sleeve and a pair of nuts mounted on said first sleeve retaining said second sleeve, and tapered bearings mounted about said first sleeve in said case.

* * * * *